(12) United States Patent
De Laurentiis et al.

(10) Patent No.: US 7,978,801 B2
(45) Date of Patent: Jul. 12, 2011

(54) CLOCK AND DATA RECOVERY METHOD AND CORRESPONDING DEVICE

(75) Inventors: Pierpaolo De Laurentiis, Milan (IT); Lina Ferrari, Milan (IT); Stefano Manzoni, Cernusco (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 1007 days.

(21) Appl. No.: 11/810,788

(22) Filed: Jun. 6, 2007

(65) Prior Publication Data

US 2007/0280392 A1    Dec. 6, 2007

(30) Foreign Application Priority Data

Jun. 6, 2006  (EP) ..................................... 06011597

(51) Int. Cl.
*H04L 7/00*    (2006.01)
(52) U.S. Cl. ...................................................... 375/355
(58) Field of Classification Search .................. 375/354, 375/355, 373, 371, 376
See application file for complete search history.

(56) References Cited

U.S. PATENT DOCUMENTS

| | | | | |
|---|---|---|---|---|
| 4,949,051 | A | 8/1990 | Viola | 331/11 |
| 5,812,619 | A | 9/1998 | Runaldue | 375/376 |
| 6,611,219 | B1 | 8/2003 | Chen et al. | 341/141 |
| 6,650,661 | B1 * | 11/2003 | Buchanan et al. | 370/516 |
| 6,694,462 | B1 * | 2/2004 | Reiss et al. | 714/724 |
| 7,409,031 | B1 * | 8/2008 | Lee et al. | 375/376 |
| 2002/0099987 | A1 * | 7/2002 | Corbin et al. | 714/718 |
| 2003/0115542 | A1 * | 6/2003 | Hwang et al. | 714/798 |
| 2004/0202261 | A1 * | 10/2004 | Gregorius | 375/354 |
| 2004/0202266 | A1 * | 10/2004 | Gregorius et al. | 375/355 |
| 2005/0069071 | A1 * | 3/2005 | Kim et al. | 375/355 |
| 2005/0078782 | A1 | 4/2005 | Dunning et al. | 375/373 |
| 2005/0286643 | A1 * | 12/2005 | Ozawa et al. | 375/242 |
| 2006/0109942 | A1 * | 5/2006 | Vallet | 375/355 |

FOREIGN PATENT DOCUMENTS

EP    1 209 842 A1    5/2002

OTHER PUBLICATIONS

Lai, B. et al., "A Monolithic 622Mb/s Clock Extraction Data Retiming Circuit," *ISSCC Dig. Tech. Papers*, Feb. 14, 1991, pp. 144-145.
Park, J.-Y. et al., "A 1.0 Gbps CMOS Oversampling Data Recovery Circuit with Fine Delay Generation Method," *IEICE Trans. Fundamentals*, vol. E83-A, No. 6, Jun. 2000, pp. 1100-1105.

(Continued)

*Primary Examiner* — Chieh M Fan
*Assistant Examiner* — Aristocratis Fotakis
(74) *Attorney, Agent, or Firm* — Lisa K. Jorgensen; Jeremiah J. Baunach; Seed IP Law Group PLLC

(57) ABSTRACT

A clock and data recovery method comprising the following steps: an oversampling step wherein an oversampled stream of samples is generated from an input data stream at a data rate by using reference clock signal at a clock rate, the clock rate being higher than the data rate, and a tracking step of the input data stream realised by locating transitions between adjacent samples of the oversampled stream and by moving a no transition area within the oversampled stream wherein no transitions between adjacent samples are found a recovered data signal being obtained as a central portion of the no transition area and a recovered clock signal being obtained by dividing the reference clock signal. A clock and data recovery device is also described.

35 Claims, 7 Drawing Sheets

OTHER PUBLICATIONS

Poulton, J. et al., "A Tracking Clock Recovery Receiver for 4-Gbps Signaling," *IEEE Micro*, vol. 18, Issue 1, Jan./Feb. 1998, pp. 25-27.

Rhee, W. et al., "A Semi-Digital Delay-Locked Loop Using an Analog-Based Finite State Machine," *IEEE Transactions on Circuits and Systems II: Express Briefs*, vol. 51, Issue: 11, Nov. 2004, pp. 635-639.

Sun, Sam Y., "An Analog PLL-Based Clock and Data Recovery Circuit with High Input Jitter Tolerance," *IEEE Journal of Solid-State Circuits*, vol. SC-24, Apr. 1989, pp. 325-330.

Yang, C.-K. K., et al., "A 0.5-μm CMOS 4.0-Gbit/s Serial Link Transceiver with Data Recovery Using Oversampling," *IEEE Journal of Solid-State Circuits*, vol. 33 No. 5, May 1998, pp. 713-722.

\* cited by examiner

CLOCK AND DATA RECOVERY METHOD AND CORRESPONDING DEVICE

BACKGROUND

1. Technical Field

The present disclosure relates to a clock and data recovery method and corresponding device.

The description particularly, but not exclusively, relates to a clock and data recovery method for an ASIC chip designed for telecom/datacom applications and the following description is made with reference to this field of application for convenience of explanation only.

2. Description of the Related Art

An ASIC (acronym from Application-Specific Integrated Circuit) is a chip designed for a particular application. It typically consists of a core logic, where the specific application is implemented, and an in/out interface, that connects the specific application to the overall system.

An ASIC for telecom/datacom applications generally includes, as an input/output interface, a SERDES interface (serial-to-parallel/parallel-to-serial interface). Its goal is to adapt high speed serial data rate of a data line to a low speed parallel data rate of the chip core. Line data rate is linked to bandwidth requirements of communication systems and limited by technology. Core data rate is linked to the available technology (for instance, the CMOS technology presently used) in terms of both maximum operating frequencies and digital design tools.

Apart from the individual trends of line and core data rates (the former growing up faster than the latter), new applications typically require a certain degree of back-compatibility with respect to old applications.

Hence, an ASIC is generally able to treat a high data rate as well as a low data rate through the very same SERDES interface. It should be noted that the low data rate is usually an integer sub-rate of the high data rate.

More particularly, for telecom/datacom applications in data transmission through ASICs, the reliability and the quality of a data link or generally of a communication line depends on the timing control.

In addition, the transmission of a clock signal from one end to the other of a communication line in a telecom/datacom system is expensive, both because the clock signal is not a payload and because of technology limitations due to its bandwidth.

Nowadays, the latter issue is usually solved in the field by double data rate interfaces. According to this solution, both the rising and the falling edges of the clock signal are used as reference events (in contrast with normal data rate interfaces where only one type of edge, the rising or falling one, of the clock signal is used as a reference event). In this way data and clock signals have the very same physical bandwidth. However, the known solutions are still affected by the former problem.

Moreover, communication lines with a clock signal transmitted therethrough have strong timing budget requirements, which become harder and harder to meet when the data rate increases, since the bit period becomes smaller and smaller.

The most popular way to control timing is by embedding a clock signal into the transmitted data and recovering the timing information at the receiver side of the communication line by means of a clock and data recovery device (CDR in the following). In particular, the CDR recovers the timing information based on the transitions of input data, under the assumption that the nominal bit period is constant, thus producing a recovered data signal as well as a recovered clock signal.

Then, taking recovered data and clock signals from the CDR, a serial to parallel converter matches the line data rate and the core data rate.

Traditionally, analog phase-locked loops (PLL) have been used to implement CDR devices. Although, in general, an analog PLL can operate at high frequencies, it suffers from problems such as, for instance, the frequency drift during long sequences of identical bits (also indicated as CID, Consecutive Identical Digits) and the difficult lock acquisition process (at the power on or after a loss of synchronization).

Being a CDR using analog PLL a fully analog solution, high performances are expected, but they are paid in terms area and power consumption. Another drawback is a hardly portable design through technologies. CDRs of this kind are described in the following references:

U.S. Pat. No. 4,949,051 issued on Aug. 14, 1990 to J. P. Viola and concerning a "Phase lock clock recovery with aided frequency acquisition";

"A monolithic 622 Mb/s clock extraction data retiming circuit", Benny Lai, Richard C. Walker, ISSCC Dig. Tech. Papers, pp. 144-145, February 1991; and "An analog PLL-based clock and data recovery circuit with high input jitter tolerance" Sam Y. Sun, IEEE JSSC vol. SC-24, pp. 325-330, April 1989.

Another approach to timing or clock recovery is the digital one. Here, the smallest possible analog front end is used to generate timing information that feeds a recovery algorithm. This algorithm is usually described and implemented using a high level language (VHDL).

In this way, a certain degree of portability through technologies is possible as well as some area and power saving. On the other hand, it is difficult to obtain high performance devices.

Digital timing recovery in a serial connection line is typically done by a CDR device in two ways that are by tracking and by oversampling.

In a tracking CDR, an optimum sampling phase is chosen among a discrete set, by an appropriate algorithm, and the output data is the input data which is sampled by the selected sampling phase. CDRs of this kind are described in the following references:

U.S. Pat. No. 5,812,619 issued on Sep. 22, 1998 to Runaldue and concerning a: "Digital phase lock loop and system for digital clock recovery";

"A tracking clock recovery receiver for 4-Gbps signaling", J. Poulton, W. I. Dally, S. Tell, IEEE Micro Vol. 18 Issue 1, pp. 25-27, January/February 1998; and "A semi-digital delay-locked loop using an analog-based FSM", W. Rhee, B. Parker, D. Friedman, IEEE Trans. on Cir. and Sys. II: E. B. Vol. 51 Issue: 11, pp. 635-639, November 2004.

In an oversampling CDR, the input data are sampled by more than one phase at the same time and an algorithm takes the decision of which value has been sampled. CDRs of this kind are described in the following references:

U.S. Pat. No. 6,611,219 issued on Aug. 26, 2003 to Lee et al. and concerning an: "Oversampling data recovery apparatus and method";

"A 1.0 Gbps CMOS oversampling data recovery circuit with fine delay generation method" J.-Y. Park, J. K. Kang, IEICE Trans. Fund. Vol. E83 No. 6, June 2000; and "A 0.5 um CMOS 4.0 Gb/s serial link transceiver with data recovery using oversampling", C.-K. K. Yang, R. Farjad-Rad, M. A, Horowitz, IEEE JSSC Vol. 33 No. 5, May 1998.

A strong difference between tracking and oversampling CDRs is that the former solution recovers the clock while the latter recovers the data. In other words, the output of a tracking CDR is a data-clock pair with a known phase relationship, while the output of an oversampling CDR is typically a data signal.

The main drawbacks of the above described solutions are as follows:
- custom design is still rather dominant so technology portability is difficult;
- efforts and tradeoffs are required to cover wide data rate ranges;
- the scalability is more and more difficult with increasing data rate.

The technical problem underlying the present description is that of providing a clock and data recovery method and corresponding device having structural and functional characteristics which allow to improve the scalability with different technologies and frequencies, in this way overcoming the limits which still affect the conventional methods and devices.

BRIEF SUMMARY

An embodiment of the present invention provides a clock and data recovery method and corresponding device able to mix the tracking and oversampling features using a serial-to-parallel converter that oversamples the input data and a divider that can be controlled to track input data.

In one aspect, a clock and data recovery method comprises the following steps: an oversampling step wherein an oversampled stream of samples is generated from an input data stream (IDS) at a data rate by using reference clock signal (CK) at a clock rate, said clock rate being higher than said data rate, and a tracking step of said input data stream (IDS) realised by locating transitions between adjacent samples of said oversampled stream and by moving a no transition area within said oversampled stream wherein no transitions between adjacent samples are found, a recovered data signal (RDATA) being obtained as a central portion of said no transition area and a recovered clock signal (RCK) being obtained by dividing said reference clock signal (CK). In one embodiment, said tracking step uses a search window (SW) of a subset of said oversampled stream samples, centred with respect to said input data stream (IDS). In one embodiment, the method further comprises: a first search state, wherein said subset of oversampled stream samples corresponding to said search window (SW) are checked in order to find said no transition area; when said no transition area is found, the method switching into, a second track state, wherein said subset of oversampled stream samples corresponding to said search window (SW) are checked in order to verify that no transition occurs between adjacent samples, and analyzed in order to track the input data stream aligning accordingly to said reference clock signal (CK), the method coming back to said first search state when a transition occurs. In one embodiment, said first search state comprises: an initialising sequence (S1, S2, S3); a main loop (A), to count a number of times without any transition in said input data stream (IDS); a first auxiliary loop (B), to count a number of a first driving command (SLIP) with respect to a number of said oversampled stream samples; a second auxiliary loop (C), to verify whether a minimum eye aperture condition is verified or not; the method providing a first and second output conditions from said first search state corresponding to a change of state (TS, S7) and to an alarm for no eye aperture found (S14). In one embodiment, said main loop (A) comprises: a first verify step (S4), wherein a first condition (PO[N−k]= . . . =PO[k−1]) is checked; a first counting step (S5), wherein a first counter (SEARCH_CNT) is incremented; and a second verify step (S6), wherein it is located when said first counter (SEARCH_CNT) is equal to a first value (N_LOCK), the method changes from said main loop (A) to said first auxiliary loop (B) when said first condition is not verified and a transition occurs before said first value (N_LOCK) is reached. In one embodiment, in case said first counter (SEARCH_CNT) is equal to said first value (N_LOCK), the method further comprises a first assertion step (S7) wherein a first state parameter (LOCK) is asserted, said first counter (SEARCH_CNT) keeping count of how many times no transitions are found in said search window (SW). In one embodiment, said first counter (SEARCH_CNT) it is set equal to 0 and reset when it reaches said first value (N_LOCK), such value being equal to the number of times without transitions in order to assert said first state parameter (LOCK) and provide said first output condition corresponding to a first change of state (TS) to move the method from said first search state to said second track state. In one embodiment, said first auxiliary loop (B) comprises: a first searching step (S8), wherein said subset of oversampled stream samples is scrolled up starting from a central position of said search window (SW); a third verify step (S9), wherein it is verified when a second counter (SLIP_CNT) is equal to a count value (N−1); and a second counting step (S10), wherein said second counter (SLIP_CNT) is incremented, said second counter (SLIP_CNT) keeps count of how many scroll of said subset of oversampled stream samples have been taken, the method changes from said first auxiliary loop (B) to said second auxiliary loop (C) when said second counter (SLIP_CNT) is equal to said count value (N−1); otherwise the method returns to said first verify step (S4). In one embodiment, said second counter (SLIP_CNT) is set equal to 0, and reset at said count value (N−1) after said oversampled stream has been all scanned, N being the number of said samples. In one embodiment, said second auxiliary loop (C) comprises: a third counting step (S11), wherein a current width (N−2*k) of said search window (SW) is narrowed; and a fourth verify step (S12), wherein it is verified when said current width (N−2*k) is narrower than a boundary condition parameter (MIN_EYE_APE). In one embodiment, if said current width (N−2*k) of said search window (SW) is not narrower than said boundary condition parameter (MIN_EYE_APE), the method further comprises a first reset step (S13), wherein said second counter (SLIP_CNT) is set equal to 0 and the method goes back to said first verify step (S4) and otherwise, the method comprises a final assertion step (S14) wherein said driving parameter (NO_EYE) is asserted and said second output condition corresponding to an alarm for no eye aperture found is provided. In one embodiment, said current with (N−2*k) of said search window (SW) is set at an initial value (N−2*k0), and reset when said first or said second output condition is provided, while said boundary condition parameter (MIN_EYE_APE) defines a minimum eye aperture that can be detected in said input data stream (IDS) corresponding to said second output condition. In one embodiment, in said second track state, the method comprises a checking phase of transitions in a first and a second subset of oversampled stream samples by means of respective track vectors (VU, VD) in order to decide whether said oversampled stream is to be not scrolled, scrolled up or scrolled down, a length (TW) of said track vectors (VU, VD) being programmable, said track vectors (VU, VD) latching the transitions within said first and second subset of oversampled stream samples, said checking phase being recursive. In one embodiment, said second track state comprises: an initialising sequence; a first waiting loop (D), where nothing is done for N_WAIT cycles of an oversampling clock; a check and assertion sequence (S18, S19, SS) wherein a third output condition corresponding to a second change of state (SS) from the said track state to said search state is provided; a second tracking loop (E), where said track vectors are analyzed in order to take a proper decision to track said input data stream (IDS). In one embodiment, said first waiting loop (D) of said second track state comprises: a fifth verify step (S15), wherein a fourth counter (W_CNT) of cycles of said oversampling clock is compared with a parameter (N_WAIT) that defines a waiting time and that is programmable; and a fourth counting step (S16), wherein said fourth counter (W_CNT) is incremented. In one embodiment, said fifth verify step (S15) is substituted by a counting step wherein said transitions are separately counted for each samples of said oversampled stream. In one embodiment, the clock and data recovery method further comprises: a second reset step (S17), wherein said counter (W_CNT) is set equal to 0 once it has reached a value equal to said parameter (N_WAIT) that defines a waiting time; a sixth verify step (S18), wherein said subset of oversampled stream samples corresponding to said search window (SW) are checked in order to find out if a transition has occurred; and in case a transition has occurred in said search window (SW), the method further comprises a third assertion step (S19) wherein a second state parameter (UNLOCK) is asserted and said third output condition corresponding to a second change of state (SS) to move the method from said second track state to said first search state is provided, otherwise, the method changes from said first waiting loop (D) to said second tracking loop (E). In one embodiment, said second tracking loop (E) comprises: a seventh verify step (S20), wherein a fifth counter (J) is compared with said length (TW) of said track vectors (VU, VD) and if the value of said fifth counter (J) is equal to said length (TW), then said fifth counter (J) is set to 1 and the method further comprises: a fourth assertion step (S21), wherein a third state parameter (NO_TRAN) is asserted; and a first decision step (S22), wherein first and second driving commands (SLIP/PILS) are kept on hold (DO_NOTHING). In one embodiment, if the value of said fifth counter (J) is not equal to said length (TW), the method further comprises: a fifth assertion step (S23), wherein a fourth state parameter (TRAN) is asserted; and an eighth verify step (S24), wherein it is checked a first condition corresponding to whether the j-th bits of said track vectors (VU, VD) are both equal to 1 (VU[j]=VD[j]=1) or not. In one embodiment, if said first condition is verified, then the method further comprises: a second decision step (S25), wherein said first and second driving commands (SLIP/PILS) are kept on hold (DO_NOTHING); otherwise, the method comprises: a ninth verify step (S26), wherein it is checked a second condition corresponding to whether or not the j-th bit of said first track vector (VU) is equal to 1 and the j-th bit of said second track vector (VD) is equal to 0 (VU[j]=1; VD[j]=0) and, is said second condition is verified, a third decision step (S27), wherein a first decision corresponding to said first driving command (SLIP) is taken corresponding to said oversampled stream being scrolled up. In one embodiment, if said second condition is not verified, the method further comprises: a tenth verify step (S28), wherein it is checked a third condition corresponding to whether or not the j-th bit of said first track vector (VU) is equal to 0 and the j-th bit of said second track vector (VD) is equal to 1; and, if said third condition is verified a fourth decision step (S29), wherein a second decision corresponding to said second driving command (PILS) is taken corresponding to said oversampled stream being scrolled down. In one embodiment, if said third condition is not verified, the method further comprises: a fifth counting step (S30), wherein said fifth counter (J) is incremented and after which the method returns to said seventh verify step (S20). In one embodiment, each time a decision step is executed (S21, S25, S27, S29), then the method returns to said fifth verify step (S15) and said fifth counter (J) is set to 1.

In one embodiment, a clock and data recovery device (1) comprises at least a first input terminal (IN) receiving an input data stream (IDS) at a data rate and a second input terminal (INck) receiving a reference clock signal (CK) at a clock rate, as well as a first output terminal (OUTrd) providing a recovered data signal (RDATA), a second output terminal (OUTrc) providing a recovered clock signal (RCK), an oversampling portion (2) comprising at least a serial-to-parallel converter (4) having a first input terminal (IN4) connected to said first input terminal (IN) of said clock and data recovery device (1), thus receiving said input data stream (IDS), a second input terminal (IN4ck) connected to said second input terminal (INck) of said clock and data recovery device (1), thus receiving said reference clock signal (CK) and a parallel output (PO[i], i=1 ... N), the first input bit of a current word of said input data stream (IDS) being at the N-th output terminal (PO[N]) and the N-th input bit of a current word of said input data stream (IDS) being at the first output terminal (PO[1]), a central output terminal (PO[N/2-1]) being connected to said first output terminal (OUTrd) of said clock and data recovery device (1) and providing said recovered data signal (RDATA) at said data rate, said clock rate being higher than said data rate; and a tracking portion (3) comprising at least divider (5) connected to a detection and decision block (7), said divider (5) having at least a first input terminal (IN5ck) connected to said second input terminal (INck) of said clock and data recovery device (1) and receiving said reference clock signal (CK) and an output terminal (OUT5) connected to said second output terminal (OUTrc) of said clock and data recovery device (1) and providing said recovered clock signal (RCK), said detection and decision block (7) having a parallel input (PI[i], i=1 ... N) connected to the parallel output terminals (PO[i]) of said serial-to-parallel converter (4) of said oversampling portion (2). In one embodiment, said output terminal (OUT5) of said divider (5) of said tracking portion (3) is further connected to said serial-to-parallel converter (4) of said oversampling portion (2). In one embodiment, said detection and decision block (7) comprises a detection block (7A) and a decision block (7B) connected to each other, said detection block (7A) having said parallel input (PI[i], i=1 ... N) connected to said parallel output (PO[i], i=1 ... N) of said serial-to-parallel converter (4) and said decision block (7B) has a first and second output terminals (OUT7, OUT7*), connected to respective first and second input terminals (IN5, IN5*) of said divider (5) and providing thereto respective first and second driving signals (SLIP, PILS), which change a dividing ratio of said divider (5) of +1 and −1, respectively. In one embodiment, said first and second driving signals (SLIP, PILS) drive said serial-to-parallel converter (4) in order to move and keep a no transition area wherein no transitions between adjacent samples are found in the middle of said parallel output (PO[i], i=1 ... N). In one embodiment, said serial-to-parallel converter (4) of said oversampling portion (2) comprises a hold portion (4A) to store a last input bit of a previous input data stream, said hold portion (4A) having a further output terminal (PO[N+1]) wherein a last input bit of a previous word of said input data stream (IDS) is provided at the same time of the N input bits of a current input data stream (IDS) and which is connected to a further input terminal (PI[N+1]) of said detection and decision block (7).

In one embodiment, a clock and data recovery device comprises: a serial-to-parallel converter configured to oversample an input data stream at a reference clock rate higher than a data rate of the input data stream and having a number of parallel outputs for a current data word; and a tracking module coupled to the number of parallel outputs of the serial-to-parallel converter and configured to produce a recovered clock signal for the input data stream and to generate a control signal to cause the serial-to-parallel converter to provide a recovered data signal on an output of the number of parallel outputs. In one embodiment, the clock and data recovery device further comprises: an input to receive a reference clock signal coupled to the serial-to-parallel converter and the tracking circuit. In one embodiment, the tracking module comprises a divider configured to receive the reference clock signal and to provide the control signal to the serial-to-parallel converter. In one embodiment, the serial-to-parallel converter has an output for a last input bit of a previous word coupled to the tracking module; and the output providing the recovered data signal is a middle output in the number of parallel outputs. In one embodiment, the tracking module is configured to: detect transitions between adjacent samples provided by the serial-to-parallel converter; and selectively change a dividing ratio of the divider based on the detection of a transition. In one embodiment, the control signal causes the serial-to-parallel converter to maintain a no-transition window on outputs in the number of parallel outputs adjacent to the output providing the recovered data signal.

In one embodiment, a system comprises: a reference clock configured to generate a reference clock signal; a serial-to-parallel converter configured to oversample an input data stream using the reference clock signal and having a number of parallel outputs for a current data word; and a tracking module coupled to the number of parallel outputs of the serial-to-parallel converter and configured to produce a recovered clock signal for the input data stream and to generate a control signal to cause the serial-to-parallel converter to provide a recovered data signal on a middle output of the number of parallel outputs, the reference clock signal having a frequency higher than a data rate of the input data stream. In one embodiment, the tracking module comprises a divider configured to receive the reference clock signal and to provide the control signal to the serial-to-parallel converter. In one embodiment, the serial-to-parallel converter has an output for a last input bit of a previous word coupled to the tracking module. In one embodiment, the tracking module is configured to: detect transitions between adjacent samples provided by the serial-to-parallel converter; and selectively change a dividing ratio of the divider based on the detection of a transition. In one embodiment, the control signal causes the serial-to-parallel converter to maintain a no-transition window on outputs in the number of parallel outputs adjacent to the middle output. In one embodiment, the reference clock signal frequency is equal to the number of parallel outputs multiplied by the data rate of the input data stream.

BRIEF DESCRIPTION OF THE SEVERAL VIEWS OF THE DRAWINGS

In such drawings.

DETAILED DESCRIPTION

Figure 1:
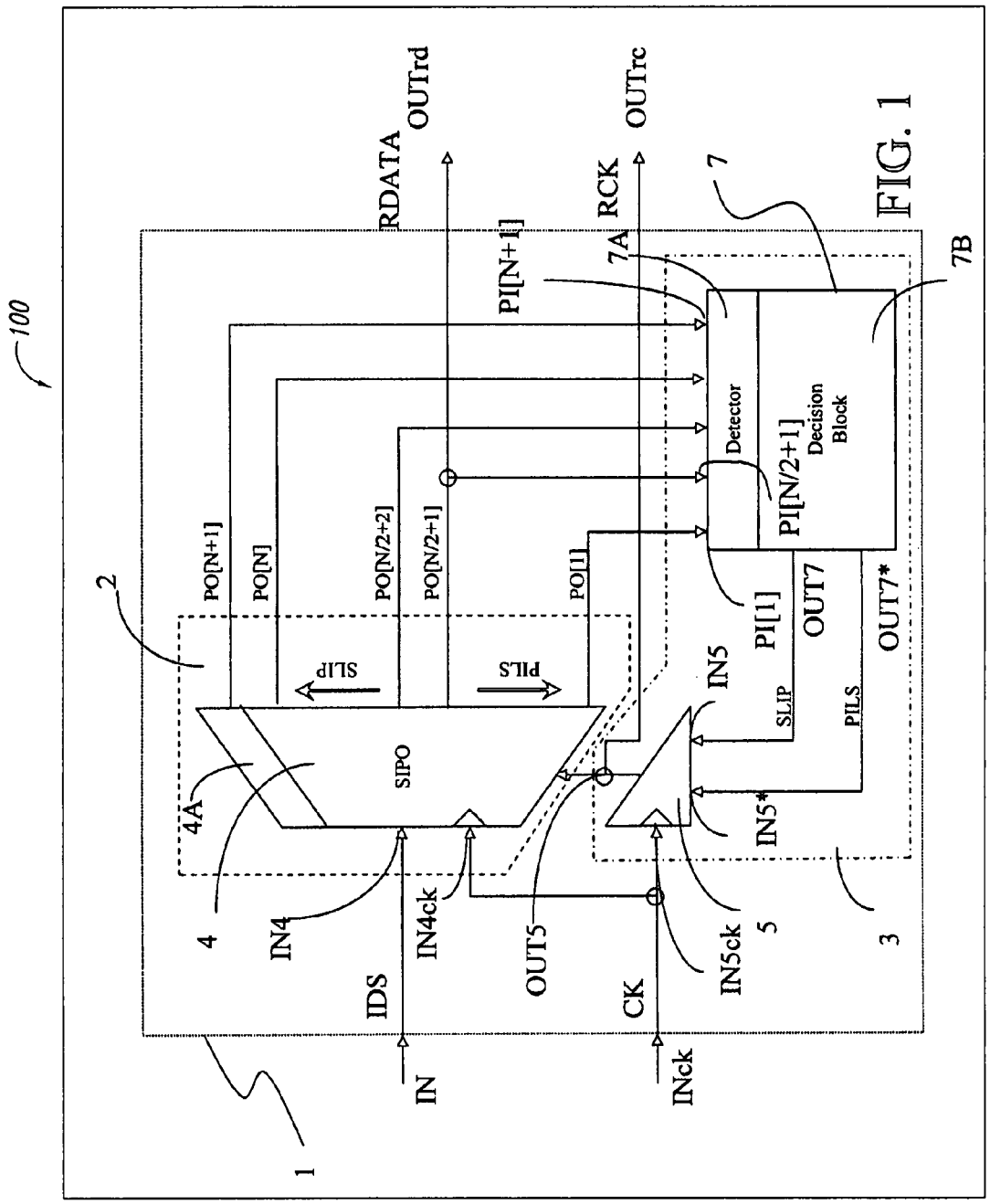
FIG. 1 schematically shows a system with a clock and data recovery device realised according to an embodiment.

FIG. 1 shows a system 100 including a clock and data recovery device 1. The clock and data recovery device 1 comprises an oversampling portion 2 and a tracking portion 3, duly mixed in order to provide the desired recovery of the clock and data signals from a signal transmitted through a connection line. More particularly, an input data stream IDS is applied to a first input terminal IN of the clock and data recovery device 1, a recovered data signal RDATA being issued to a first output terminal OUTrd thereof. The clock and data recovery device 1 also has a second input terminal INck receiving a reference clock signal CK and a second output terminal OUTrc issuing a recovered clock signal RCK.

More in detail, the oversampling portion 2 comprises a serial-to-parallel converter 4 in turn including a hold portion 4A and having a first input terminal IN4 connected to the first input terminal IN of the clock and data recovery device 1, thus receiving the input data stream IDS, and a second input terminal IN4$ck$ connected to the second input terminal INck of the clock and data recovery device 1, thus receiving a reference clock CK, the reference clock CK being N times faster than the input data stream IDS, where N is an even integer. In other words, if the data rate of the input data stream IDS is fbit [Mbit/sec], the reference clock CK frequency is N*fbit [MHz].

The serial-to-parallel converter 4 also has a plurality of parallel output terminals, PO[N], . . . , PO[1], globally indicated as a parallel output PO[i], the first input bit of a current word of the input data stream IDS being at the output terminal PO[N] and the N-th input bit of the current word of the input data stream IDS being at the output terminal PO[1]. N is also the width of the parallel output PO[i].

The serial-to-parallel converter 4 is also indicated as SIPO (Serial In Parallel Out).

A central output terminal PO[N/2+1] is connected to the first output terminal OUTrd of the clock and data recovery device 1, wherein the recovered data signal RDATA is provided, having a rate equal to the data rate fbit. The serial-to-parallel converter 4 realises an oversampling of the input data stream IDS at a rate equal to N*fbit.

It should be noted that the above indicated relationship between data rate fbit and clock frequency N*fbit as well as the even parity for N is not binding and it is here considered only for the sake of convenience and simplicity.

The serial-to-parallel converter 4 has a further output terminal PO[N+1] in correspondence of its hold portion 4A, wherein a last input bit of a previous word of the input data stream IDS is provided at the same time of the N input bits of the current input data stream IDS, for looking for transitions over N bits.

Moreover, the tracking portion 3 comprises a divider 5 having a first input terminal IN5ck connected to the second input terminal INck of the clock and data recovery device 1 and receiving the reference clock signal CK, as well as a second and third input terminals, IN5 and IN5*, connected to respective output terminals, OUT7 and OUT7*, of a detection and decision block 7, also included in the tracking portion 3.

The divider 5 also has an output terminal OUT5 connected to the serial-to-parallel converter 4 as well as to the second output terminal OUTrc of the clock and data recovery device 1, wherein the recovered clock RCK is provided. The recovered clock RCK is provided by the divider 5 and it is a divided signal having a rate which is equal to the data rate fbit.

The detection and decision block 7 comprises a detection block or detector 7A and a decision block 7B connected to each other, the detection block 7A having a plurality of parallel input terminals PI[N+1], ..., PI[1], globally indicated as a parallel input PI[i], connected to the parallel output PO[i] of the serial-to-parallel converter 4. Moreover, the decision block 7B has the first and second output terminals, OUT7 and OUT7*, connected to the divider 5 and providing thereto a first driving signal SLIP and a second driving signal PILS, which change a dividing ratio of the divider 5 of +1 and −1, respectively.

The clock and data recovery device 1 implements a clock and data recovery method which comprises essentially an oversampling and a tracking step, as explained in the following.

The oversampling step is performed by the oversampling portion 2 using the serial-to-parallel converter 4 which receives the reference clock CK and produce a plurality of samples forming an oversampled stream of the input data stream IDS, in particular, at the parallel output PO[i] of the serial-to-parallel converter 4, being its length equal to a bit period of the input data stream IDS itself. Each parallel output terminal thus provides a sample of the input data stream IDS.

Moreover, advantageously according to the invention, the tracking step of the input data stream IDS is then performed by the tracking portion 3.

Timing or clock information for the decision block 7B of the tracking portion 3 is obtained in terms of transitions between adjacent samples provided by the serial-to-parallel converter 4 of the oversampling portion 2 at its parallel output PO[i], such transitions being detected by the detection block 7A. Moreover, the decision block 7B controls the divider 5 of the tracking portion 3, by changing its dividing ratio of ±1 (thanks to the SLIP/PILS driving signals), in order to move and keep a no transition area in the middle of the parallel output PO[i] (central output PO[N/2+1]), i.e., an area wherein no transitions between adjacent samples are found.

The recovered data signal RDATA is thus obtained at the central output PO[N/2+1] of the serial-to-parallel converter 4 of the oversampling portion 2, while the recovered clock signal RCK is obtained at the output OUT5 of the divider 5 of the tracking portion 3. Note that the input data stream IDS is not actually serial-to-parallel converted by the clock and data recovery device 1.

Figure 2B:
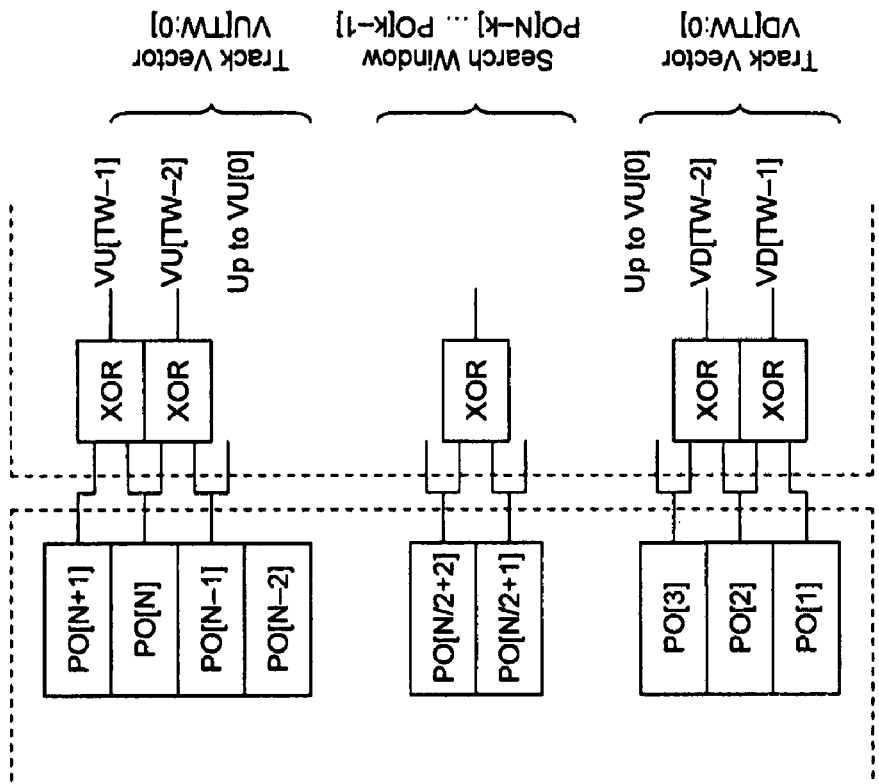
FIG. 2B represents the connection from the oversampling portion to the tracking portion of FIG. 1; it also shows the generation of the variables for the recovery algorithm.
Figure 2A:
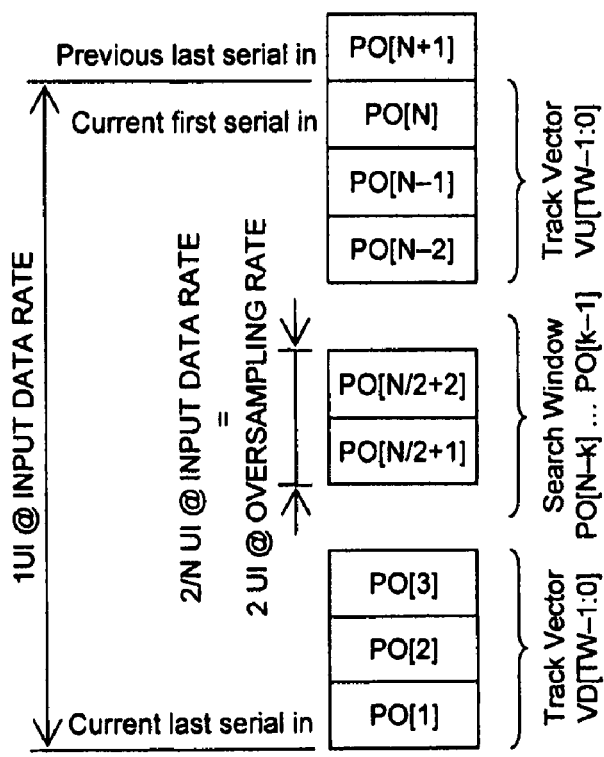
FIG. 2A represents the parallel output of the oversampling portion of FIG. 1 with respect to an input data stream; it also shows the variables for a recovery algorithm.

In order to better understand the working of the clock and data recovery device 1 according to an embodiment, reference is made to FIG. 2A, showing the parallel output PO[i] of the serial-to-parallel converter 4 of the oversampling portion 2.

As shown in FIG. 2A, it can be seen that the parallel output PO[i] covers one unit interval (1 UI=1 Tbit=1/fbit) of an input data stream IDS at the input data rate fbit, in the example shown in the figure comprising N samples. Consequently, each parallel output terminal PO[1]...PO[N] covers 1/N UI (i.e., one sample) at the input data rate fbit or 1 UI at the oversampling rate N*fbit.

FIG. 2B shows how the input data stream IDS is analyzed in order to generate variables for the recovery algorithm. In detail, the logic values at adjacent parallel output terminals of the serial-to-parallel converter 4 are tested (for instance, through exclusive- or or XOR logic function). As it will be clear in the following, information from a central range of output terminals is used during both a first or SEARCH state and a second or TRACK state (Search Window SW), while information from the boundary terminals is used during the TRACK state (in particular, by Track Vectors, as explained hereinafter). The Search Window has a programmable starting width; its current width can be narrowed down to 2 UI at the oversampling rate according to the recovery algorithm, i.e., according to the actual input data stream IDS. Track Vectors, VU and VD, are used by the recovery algorithm to drive the signals SLIP and PILS in the proper way and have the same length that is programmable.

The clock and data recovery method of an embodiment comprises the following states:

the SEARCH state, wherein the samples at the parallel output terminals of the serial-to-parallel converter 4 corresponding to the Search Window SW are checked in order to find a no transition area that is an eye aperture of the input data stream IDS wherein no transitions between adjacent samples are found. The starting width of the Search Window SW can be narrowed down to 2 UI at the oversampling rate that is the minimum operating eye aperture of the input data stream IDS. It should be noted that the data recovery method as above explained does not work when the eye aperture of the input data stream IDS is less than 2 UI at the oversampling rate.

Once such no transition area is found, the method switches to the TRACK state, wherein the samples at the parallel output terminals of the serial-to-parallel converter 4 corresponding to the search window SW are checked; if a transition is found then the method switches to the SEARCH state otherwise it stays in the TRACK state. At the same time, the parallel output terminals of the serial-to-parallel converter 4 corresponding to the track vectors VU and VD are checked in order to obtain the driving signals SLIP and PILS so that the input data stream IDS is tracked.

Figure 3:
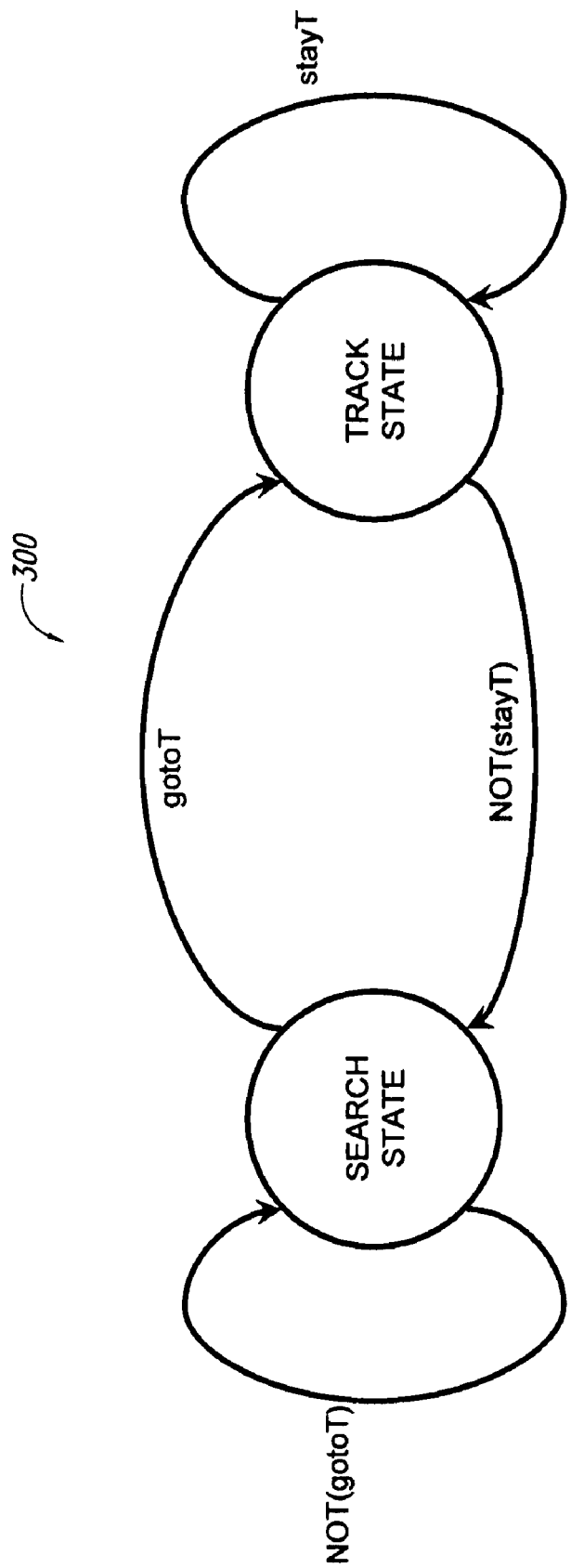
FIG. 3 shows a top level state diagram of the method according to an embodiment.

FIG. 3 represents a top level state diagram of a method 300 according to an embodiment. At the power on, the working state of the method is the SEARCH state.

The working state becomes the second or TRACK state when the current search window SW has no transition for N_LOCK times (N_LOCK may be programmable). If the previous condition is not satisfied, then the working state does not change. Details about the SEARCH state are given later on.

During the TRACK state, a single transition which is found in the current search window SW changes the working state to the SEARCH state. The working state remains the TRACK state as far as no transition is found in the current search window SW. Details about the TRACK state are given later on.

The state diagram of FIG. 3 comprises a first command gotoT, which corresponds to a first condition PO[N−k]=...=PO[k−1], N_LOCK times, and a second command stayT, which corresponds to a second condition PO[N− k]= ... =PO[k−1], wherein PO[N−k], ... , PO[k−1] is the current search window SW and N_LOCK is the number of checks without any transition in the search window SW.

A single transition in the search window SW makes the state changing from the TRACK state to the SEARCH state. This condition is opposite to the second condition PO[N−k]= ... =PO[k−1] (command NOT(stayT) in FIG. 3). On the other hand, as far as the first condition PO[N−k]= ... =PO[k−1] is not verified, the state is the SEARCH state (command NOT(gotoT) in FIG. 3].

Figure 4:
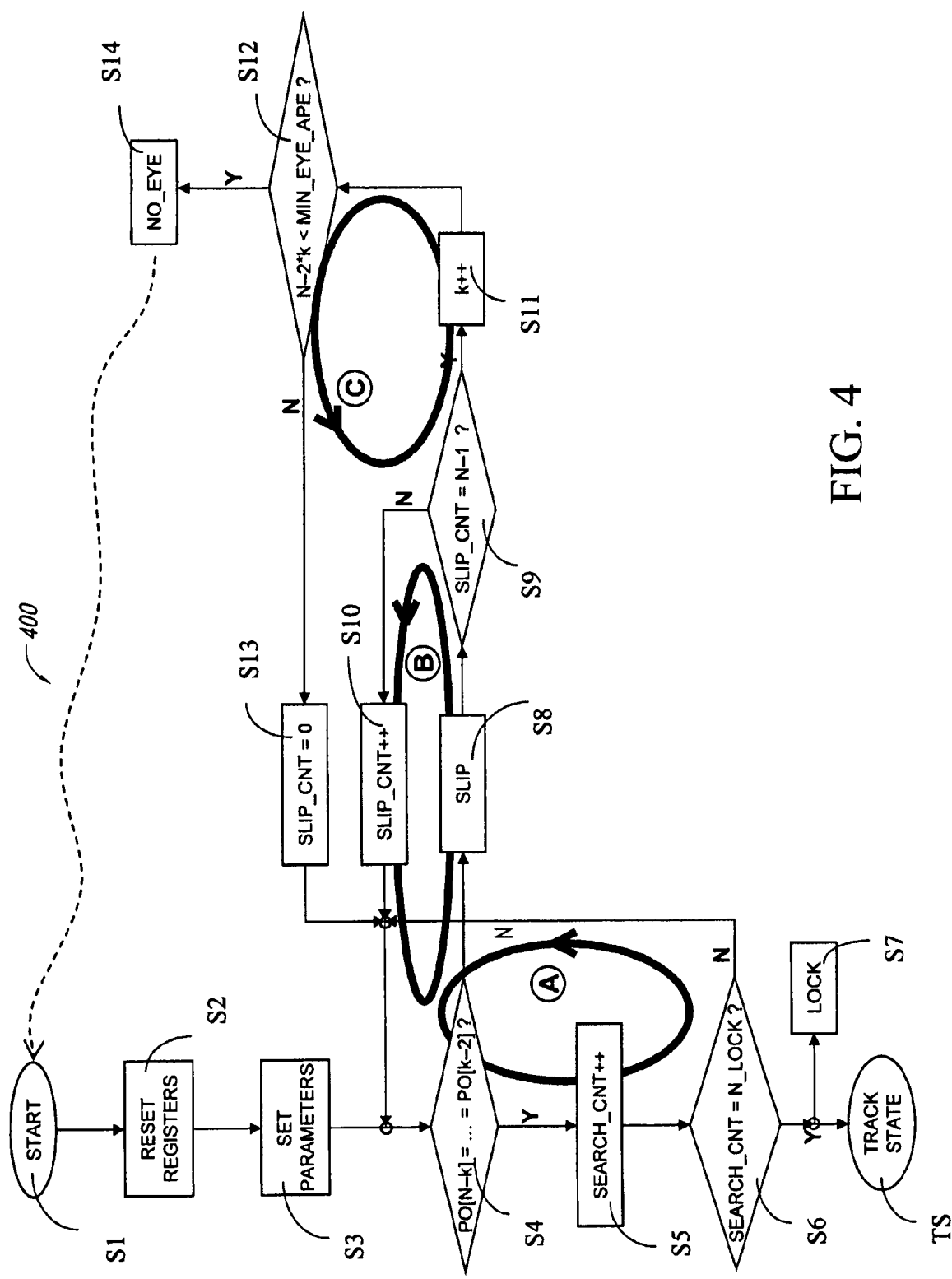
FIG. 4 shows a more detailed state diagram of the method according to an embodiment in a first state.

A flow diagram of an embodiment of a clock and data recovery method 400 in the SEARCH state is shown in FIG. 4.

The clock and data recovery method in the embodiment of the SEARCH state comprises:
  an initialising sequence (steps S1, S2, S3);
  a main loop "A", to count the number of times without any transition in the input data stream IDS (steps S4, S5, S6);
  a first auxiliary loop "B", to count the number of SLIP commands with respect to the number of parallel outputs PO[i] (steps S8, S9, S10);
  a second auxiliary loop "C", to verify whether the minimum eye aperture condition is verified or not (steps S11, S12, S13);
  the method providing a first and second output conditions of this SEARCH state corresponding to a change of state (steps TS, S7) and to an alarm for no eye aperture found (step S14).

In detail, the method 400 comprises the following steps:
  a start step S1;
  a first initialising step S2, wherein a set of registers is reset;
  a second initialising step S3, wherein a set of parameters is set;
  a first verify step S4, wherein the first condition PO[N−k]= ... =PO[k−1] is checked;
  a first counting step S5, wherein a first counter SEARCH_CNT is incremented;
  a second verify step S6, wherein it is located when the first counter SEARCH_CNT is equal to a first value N_LOCK.

In case the first counter SEARCH_CNT equal to the first value N_LOCK, the method further comprises a first assertion step S7 wherein a first state parameter LOCK is asserted and a first output condition TS (change of state) to the TRACK state is provided.

The first counter SEARCH_CNT keeps count of how many times no transitions are found in the search window SW and it is set equal to 0 and reset when it reaches the first value N_LOCK, such value being equal to the number of times without transitions in order to assert the first state parameter LOCK and move from the search state to the track state (first output condition or change of state TS).

If a transition occurs before the first value N_LOCK is reached, i.e., when the first condition PO[N−k]= ... =PO[k−1], N_LOCK times, is not verified, the method further comprises the following steps:
  a first searching step S8, wherein the parallel output PO[i] is scrolled up (decision block 7B providing a first driving signal SLIP);
  a third verify step S9, wherein it is verified when a second counter SLIP_CNT is equal to a count value N−1; and
  a second counting step S10, wherein the second counter SLIP_CNT is incremented.

The method then return to the first verify step S4.

The second counter SLIP_CNT keeps count of how many SLIP commands have been provided or scroll up decisions have been taken; it is set equal to 0, and reset when it reaches the value N−1 (i.e., after the whole parallel output PO[i] has been scrolled up), N being the number of parallel output PO[i] of the serial-to-parallel converter 4 and the oversampling ratio (even number).

If the parallel output PO[i] has been scrolled up N times, i.e., when the second counter SLIP_CNT is equal to the count value N, then the method comprises the following steps:
  a third counting step S11, wherein a current width N−2*k of the search window SW is narrowed; and
  a fourth verify step S12, wherein it is verified when the current width N−2*k of the search window SW is narrower than a boundary condition parameter MIN_EYE_APE.

If the current width N−2*k of the search window SW is not narrower than the boundary condition parameter MIN_EYE_APE, the method further comprises a first reset step S13, wherein the second counter SLIP_CNT is set equal to 0 and the method goes back to the first verify step S4.

Otherwise, the method comprises a second assertion step S14 wherein the driving parameter NO_EYE is asserted.

In particular, the initial width N−2*k0 of the search window SW is set by an initial value k0 of a k counter, being 0<k0<{N−MIN_EYE_APE}/2 and the k counter reset when an output condition, corresponding to the first output condition TS and to the first assertion step S7 or the final assertion step S14, is reached from the SEARCH state. On the other hand, the boundary condition parameter MIN_EYE_APE defines the minimum eye aperture that can be detected in the input data stream IDS and, so, it defines the second output condition of the final assertion step S14 that is whether the current width N−2*k of the search window SW is less than the minimum eye aperture, i.e., the boundary condition parameter MIN_EYE_APE.

It should be noted that the embodiment of the method 400 in the search state comprises three loops:
  a main loop A corresponding to a number of times without any transition;
  a first auxiliary loop B corresponding to a number of SLIP signal pulses against number of samples at the parallel output PO[i]; and
  a second auxiliary loop C corresponding to a minimum value of the eye aperture of the input data stream IDS.

To summarize, in the main loop A, the current search window SW, consisting of the parallel outputs PO[N−k], ... , PO[k−1], is checked. If no transitions are detected by the detection block 7A for N_LOCK consecutive times, then the method moves to the TRACK state (first output condition TS) and the first state parameter LOCK is asserted. If a transition occurs before the first value N_LOCK is reached, then the parallel output PO[i] is scrolled up (decision block 7B providing a first driving signal SLIP). If the parallel output PO[i] has been scrolled up N times, then the current width of the search window SW is narrowed and the SEARCH state restarts, the method being in the first auxiliary loop B.

If the current width of the search window SW is narrower than the boundary condition parameter MIN_EYE_APE, then the driving parameter NO_EYE is asserted, the method being in the second auxiliary loop C.

Figure 5:
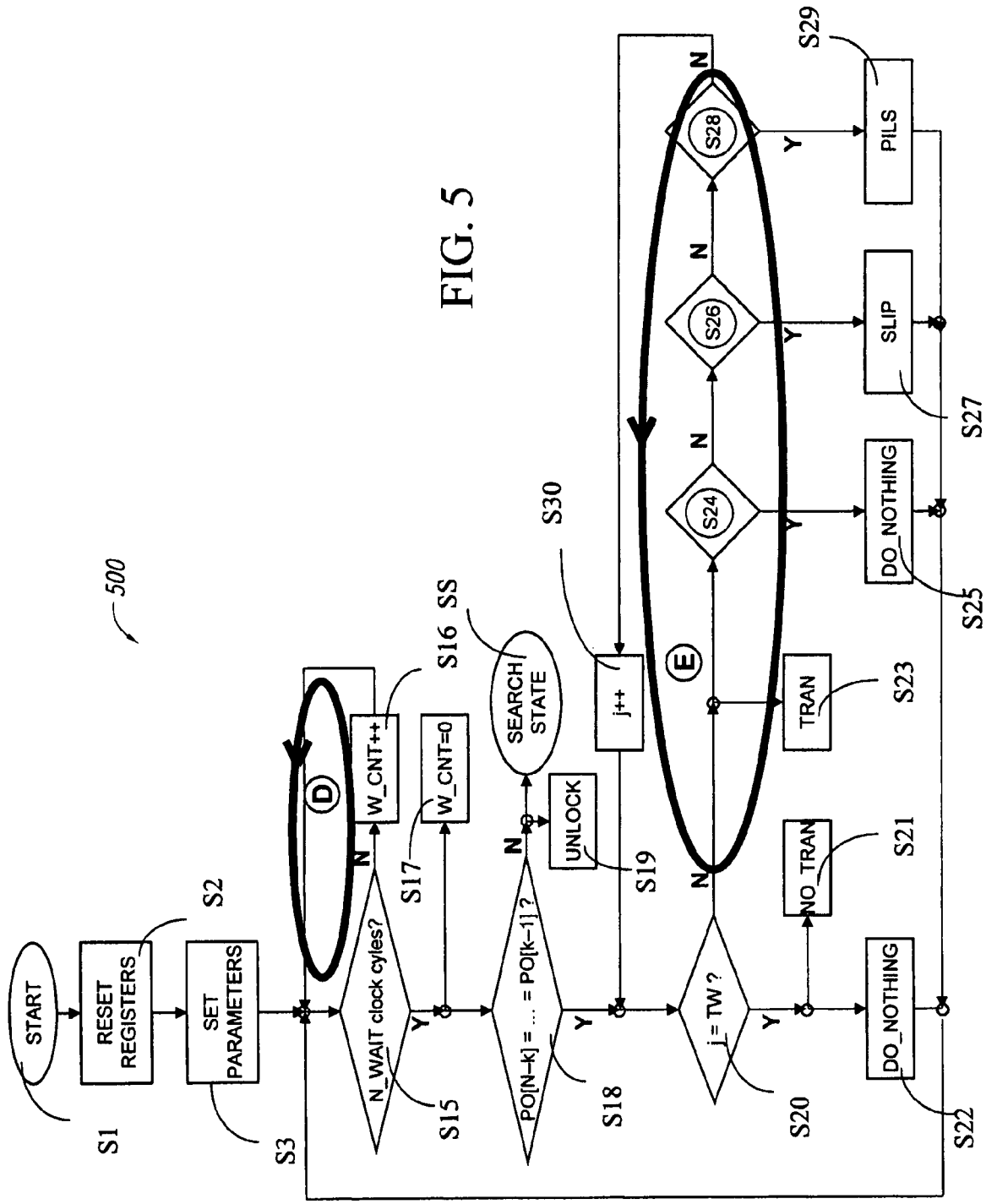
FIG. 5 schematically shows a more detailed state diagram of the method according to an embodiment in a second state.

A flow diagram of an embodiment of a clock and data recovery method 500 in the second or TRACK state is shown in FIG. 5.

During the TRACK state, the whole parallel output PO[i] is checked in order to perform different operations. If a transition occurs in the search window SW, then the method changes to the first or SEARCH state. Otherwise, a first and a second portions of the parallel output PO[i], by means of respective track vectors, indicated as VU[TW−1:0] and VD[TW−1:0], and generated by the output terminals from PO[N+1] to PO[N−TW] and from PO[TW] to PO[1] respectively, are checked in order to decide which action has to be taken in order to follow (i.e., to track) any input phase variation or transition, the length TW of the track vectors VU and VD may be programmable. A decision is one of the following:

a first or DO_NOTHING decision, which means "continue dividing by N";

a second or SLIP decision, which means "divide by N+1 for 1 UI at the oversampling rate"; and a third or PILS decision, which means "divide by N−1 for 1 UI at the oversampling rate".

Accordingly, the parallel output PO[i] is not scrolled, scrolled up (as shown by the arrow SLIP in FIG. 1) or scrolled down (as shown by the arrow PILS in FIG. 1).

As an example, considering N=10, k0=2 and TW=3, the starting width of the search window SW is 10−2*2=6 UI at the oversampling rate, while the track vectors are VU[2:0] and VD[2:0]. In detail, for the track vector VU, VU[2] latches a first transition occurring between parallel outputs PO[11:10], VU[1] latches a first transition occurring between parallel outputs PO[10:9] and VU[0] latches a first transition occurring between parallel outputs PO[9:8]. On the other hand, for the track vector VD, VD[2] latches a first transition occurring between parallel outputs PO[2:1], VD[1] latches a first transition occurring between parallel outputs PO[3:2] and VD[0] latches a first transition occurring between parallel outputs PO[4:3].

In a general manner, the track vectors latch the transitions according to the following sets of equation:

TRACK VECTOR, VU[TW−1:0]:

$VU[TW-1]=1$ when $PO[N+1]!=PO[N]$ $VU[TW-2]=1$ when $PO[N]!=PO[N-1]$ (and so on up to VU[0])

and

TRACK VECTOR, VD[TW−1:0]:

$VD[TW-1]=1$ when $PO[2]!=PO[1]$ $VD[TW-2]=1$ when $PO[2]!=PO[2]$ (and so on up to VD[0])

In order to perform the above referred actions, an embodiment of the method 500 of the TRACK state comprises:

an initialising sequence (steps S1, S2, S3);

a first or waiting loop "D", where nothing is done for N_WAIT cycles of the oversampling clock (steps S15, S16, S17);

a check and assertion sequence (steps S18, S19, SS) wherein a third output condition from the TRACK state to the SEARCH state is provided;

a second or tracking loop "E", where the track vectors are analyzed in order to take the proper decision to track the input data stream IDS (steps from S20 to S30].

In detail, apart from the initialising sequence, the method 500 comprises the following steps:

a fifth verify step S15, wherein a fourth counter W_CNT of cycles of the oversampling clock is compared with the parameter N_WAIT that defines the waiting time;

a fourth counting step S16, wherein the counter W_CNT is incremented and after which the method returns to the fifth verify step S15; and a second reset step S17, wherein the counter W_CNT is set equal to 0 once it has reached the value N_WAIT.

In this way, the waiting loop "D" is done, which lasts N_WAIT cycles of the oversampling clock (N-WAIT may be a programmable parameter), before entering the reminder of method 500 that includes the steps from S18 to S30.

Then, the method comprises:

a sixth verify step S18, wherein the central positions of the parallel output PO[i], corresponding to the search window SW, are checked in order to find out if a transition has occurred among the corresponding samples.

In case at least one transition has occurred in the search window SW, the method further comprises:

a third assertion step S19, wherein a second state parameter UNLOCK is asserted and the third output condition or change of state SS to move from the TRACK state to the SEARCH state is provided.

Otherwise, when no transition is found in the search window SW, the method enters into the tracking loop "E", where the track vectors VU and VD are scanned in order to decide which action has to be taken.

In detail, the tracking loop "E" comprises:

a seventh verify step S20, wherein a fifth counter J is compared with the length of the track vectors TW.

If the value of the counter J is TW, then the counter J is set to 1 and the method comprises:

a fourth assertion step S21, wherein a third state parameter NO_TRAN is asserted; and a first decision step S22, wherein the SLIP/PILS pair is kept on hold (DO_NOTHING).

Otherwise, when the value of the counter J is less than TW, the method comprises:

a fifth assertion step S23, wherein a fourth state parameter TRAN is asserted; and an eighth verify step S24, wherein it is checked whether the j-th bits of the track vectors VU and VD are both equal to 1 or not; if the condition VU[j]=VD[ ]=1 is satisfied, then a second decision step S25 is entered, wherein the SLIP/PILS pair is kept on hold (DO_NOTHING); otherwise, a ninth verify step S26 is entered, wherein it is checked whether or not the j-th bit of the track vector VU is equal to 1 and the j-th bit of the track vector VD is equal to 0; if the condition VU[j]=1 and VD[j]=0 is satisfied, then a third decision step S27 is entered, wherein the SLIP decision is taken; otherwise, a tenth verify step S28 is entered, wherein it is checked whether or not the j-th bit of the track vector VU is equal to 0 and the j-th bit of the track vector VD is equal to 1; if the condition VU[j]=0 and VD[j]=1 is satisfied, then a fourth decision step S29 is entered, wherein the PILS decision is taken; otherwise, a fifth counting step S30 is entered, wherein the counter J is incremented and after which the method returns to the seventh verify step S20.

It should be noted that each time a decision step is executed (S21, S25, S27, S29), then the method returns to the fifth verify step S15 and the J counter is set to 1.

The scanning strategy of the track vectors VU and VD (steps from S20 to S30) can be described according to the following recursive algorithm:

p_track_recursive{VU, VD, j}
if j=TW then NO_TRAN/DO_NOTHING (S21)
elseif VU[j]=1 & VD[j]=1 then DO_NOTHING (S24)
elseif VU[j]=1 & VD[j]=0 then SLIP (S26)
elseif VU[j]=0 & VD[j]=1 then PILS (S28)
else p_track_recursive{VU, VD, j++} (condition VU[j]=0 & VD[j]=0)

Figure 5A:
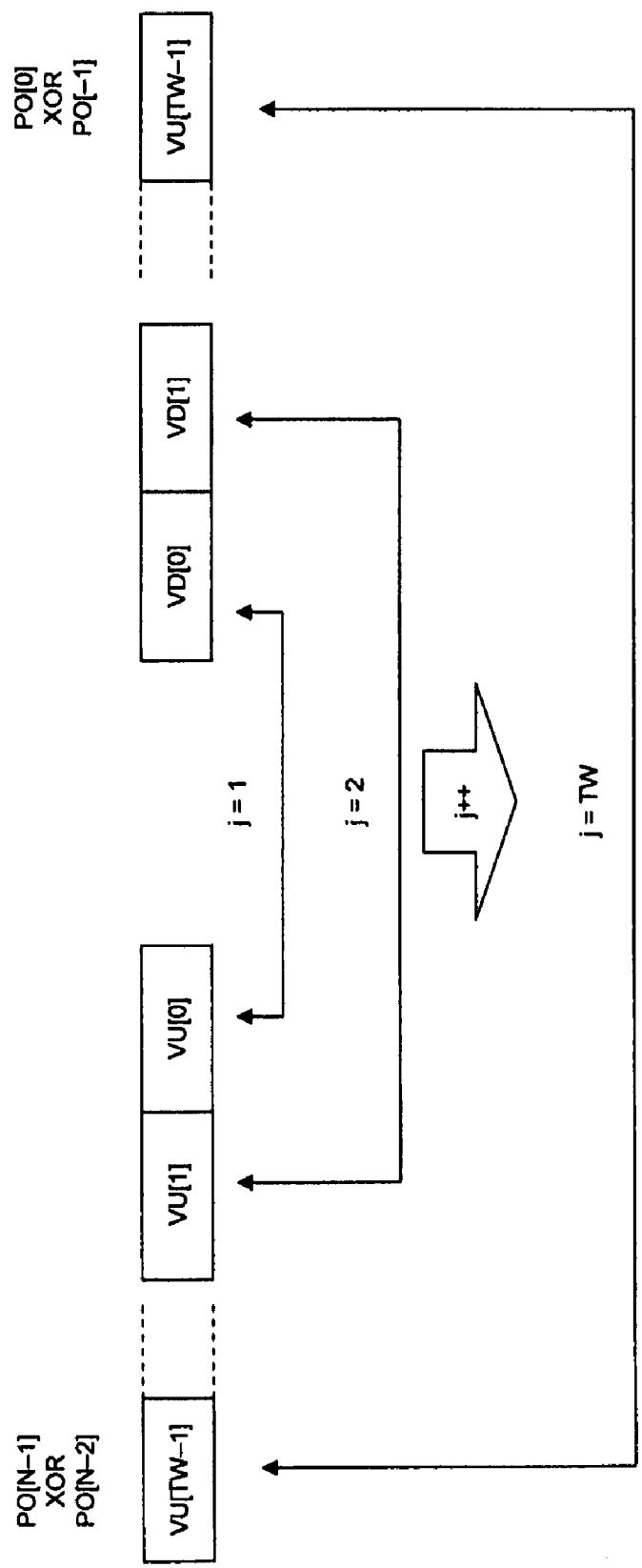
FIG. 5A schematically shows an internal portion of the block diagram of FIG. 5.

The scanning strategy of the track vectors VU and VD (steps from S20 to S30) is also described by the FIG. 5A.

Instead of latching the transitions, it is also possible to count them separately for each position or output terminal. Hence, having a high degree of information about the statistics of the transitions in a tracked eye is attainable. In other words, a histogram of such tracked eye can be traced out.

Figure 6:
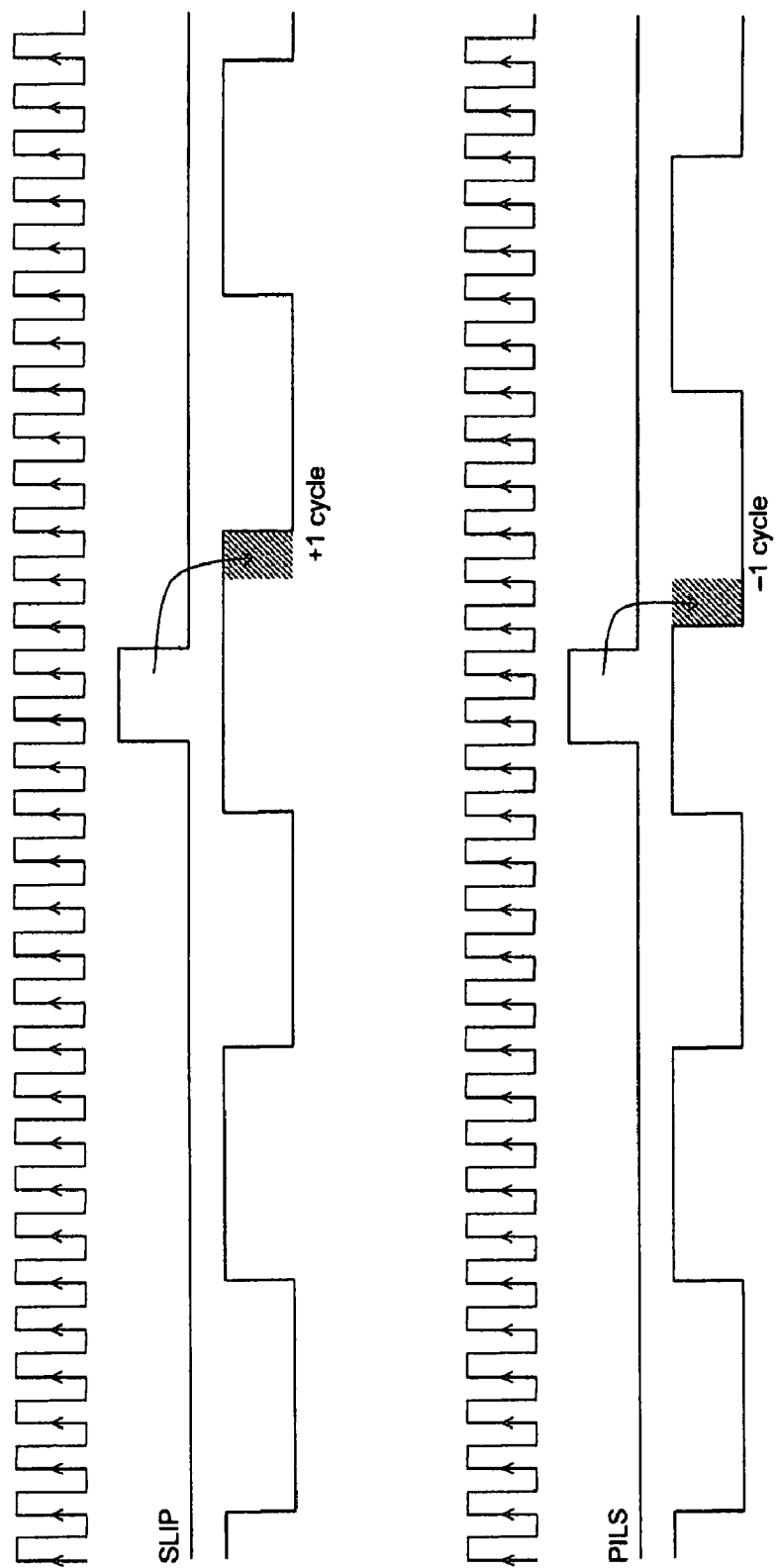
FIG. 6 schematically plots internal signals of the clock and data recovery device of FIG. 1.

FIG. 6 shows relevant waveforms for the divider 5, wherein the effect of the SLIP/PILS action is outlined (in an example with N=10). The effect of a SLIP pulse input to the divider 5 in FIG. 1 is to make the output divided clock lag of one high frequency clock cycle. Similarly, the PILS pulse makes the output divided clock anticipate its edge of one high frequency clock cycle.

In the previous description, it is assumed that, if the data rate is fbit [Mbit/sec], then the clock frequency is N*fbit [MHz], moreover N is also the width of the parallel output PO[i] of the serial-to-parallel converter 4. Actually, a different data rate can also be used, while preserving the same system-clock.

In this case, only the dividing factor of the divider 5 inside the serial-to-parallel converter 4 has to be adjusted accordingly to the date rate. To give an example, maintaining generality, it can be said that the supported data rate can become (N/D)*fbit [Mbit/s], if the divider ratio is changed to D. Of course, in this case, the method has to read only the first D bits of the parallel output PO[i] of the serial-to-parallel converter 4. The high frequency clock is still N*fbit [MHz].

In summary, a method and a corresponding device of an embodiment have been described, which recover a clock and data from a transmitted signal or input data stream IDS, using a high speed reference clock CL. The high-speed reference clock has a frequency which is N times the frequency of the data. Oversampling is performed using demultiplexing, and selection logic is not required to recover the data signal.

Embodiments of the proposed device exploit a 1 to N serial to parallel converter and a controlled divider to oversample and track an input data stream IDS.

The tracking may be managed by instantaneously changing (±1) the dividing ratio of the divider 5, in order to move and keep a no-transition area in the middle of the parallel output PO[i] of the serial-to-parallel converter 4.

Recovered data obtained at a central output PO[N/2-1] of the serial-to-parallel converter 4, while recovered clock is a divided clock issued from the divider 5 itself.

Embodiments of the clock and data recovery method and corresponding device have several advantages, among which:
  inherently area saving structure (only a serial-to-parallel converter 4 is used);
  high frequency circuitry is limited to the divider 5;
  re-usability of existing serial-to-parallel converters or more relaxed performance of new ones for implementing the serial-to-parallel converter 4;
  easily scalable with data rate; and
  it is a cheap solution when back-compatibility to low data rates is required.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A clock and data recovery method, comprising:
  oversampling an input data stream at a data rate by using a reference clock signal at a clock rate higher than the data rate, producing an oversampled stream;
  tracking the input data stream by locating transitions between adjacent samples of the oversampled stream and moving a no-transition area within the oversampled steam wherein no transitions between adjacent samples are found, wherein th tracking uses a search window of a subset of the oversampled stream samples, centered with respect to said input data stream; and
  recovering a data signal as a central portion of the no-transition area and recovering a clock signal by dividing the reference clock signal, wherein the method includes:
    a first search state, wherein said subset of oversampled stream samples corresponding to said search window are checked in order to find said no-transition area: when said no-transition area is found, the method switching into
    a second track state, wherein said subset of oversampled stream samples corresponding to said search window are checked to verify that no-transition occurs between adjacent samples, and analyzed to track the input data stream aligning accordingly to said reference clock signal, the method coming back to said first search state when a transition occurs, wherein said first search state comprises:
      an initialising sequence;
      a main loop to count a number of times without any transition in said input data stream;
      a first auxiliary loop to count a number of a first driving command (SLIP) with respect to a number of said oversampled stream samples;
      a second auxiliary loop to verify whether a minimum eye aperture condition is verified; and
      the method providing a first and second output conditions from said first search state corresponding to a change of state and to an alarm for no eye aperture found.

2. The clock and data recovery method of claim 1 wherein said main loop comprises:
  a first verify step wherein a first condition is checked;
  a first counting step wherein a first counter is incremented; and
  a second verify step wherein it is located when said first counter is equal to a first value;
  the method changes from said main loop to said first auxiliary loop when said first condition is not verified and a transition occurs before said first value is reached.

3. The clock and data recovery method according to claim 2 wherein, in case said first counter is equal to said first value, the method further comprises a first assertion step wherein a first state parameter is asserted, said first counter keeping count of how many times no transitions are found in said search window.

4. The clock and data recovery method of claim 3 wherein said first counter it is set equal to 0 and reset when it reaches said first value, such value being equal to the number of times without transitions in order to assert said first state parameter and provide said first output condition corresponding to a first change of state to move the method from said first search state to said second track state.

5. The clock and data recovery method of claim 3 wherein said first auxiliary loop comprises:
a first searching step wherein said subset of oversampled stream samples is scrolled up starting from a central position of said search window;
a third verify step wherein it is verified when a second counter is equal to a count value; and
a second counting step wherein said second counter is incremented, said second counter keeps count of how many scroll of said subset of oversampled stream samples have been taken;
the method changes from said first auxiliary loop to said second auxiliary loop when said second counter is equal to said count value; otherwise the method returns to said first verify step.

6. The clock and data recovery method of claim 5 wherein said second counter is set equal to 0, and reset at said count value after said oversampled stream has been all scanned, N being the number of said samples.

7. The clock and data recovery method of claim 6 wherein said second auxiliary loop comprises:
a third counting step wherein a current width of said search window is narrowed; and
a fourth verify step wherein it is verified when said current width is narrower than a boundary condition parameter.

8. The clock and data recovery method of claim 7 wherein, if said current width of said search window is not narrower than said boundary condition parameter, the method further comprises a first reset step, wherein said second counter is set equal to 0 and the method goes back to said first verify step and otherwise, the method comprises a final assertion step wherein said driving parameter is asserted and said second output condition corresponding to an alarm for no eye aperture found is provided.

9. The clock and data recovery method of claim 8 wherein said current width of said search window is set at an initial value, and reset when said first or said second output condition is provided, while said boundary condition parameter defines a minimum eye aperture that can be detected in said input data stream corresponding to said second output condition.

10. A clock and data recovery method, comprising:
oversampling an input data stream at a data rate by using reference clock signal at a clock rate higher than the data rate, producing an oversampled stream;
tracking the input data stream by locating transitions between adjacent samples of the oversampled stream and moving a no-transition area within the oversampled stream wherein no transition between adjacent samples are found, wherein the tracking uses a search window of a subset of the oversampled stream samples, centered with respect to said input data stream; and
recovering a data signal as a central portion of the no-transition area and recovering a clock signal by dividing the reference clock signal;
a first search state, wherein said subset of oversampled stream samples corresponding to said search window are checked in order to find said no-transition area; when said no-transition area is found, the method switching into
a second track state, wherein said subset of oversampled stream samples corresponding to said search window are checked to verify that no transition occurs between adjacent samples, and analyzed to track the input data stream aligning accordingly said reference clock signal, the method coming back to said first search state when a transition occurs, wherein, in said second track states, the method comprises a checking phase of transitions in a first and a second subset of oversampled stream samples by means of respective track vectors in order to decide whether said oversampled stream is to be not scrolled, scrolled up or scrolled down, a length of said track vectors being programmable, said track vectors (VU, VD) latching the transitions within said first and second subset of oversampled stream samples, said checking phase being recursive, and wherein said second track state comprises:
an initialising sequence;
a first waiting loop for a threshold number of cycles of the reference clock;
a check and assertion sequence wherein a third output condition corresponding to a second change of state from the said track state to said search state is provided; and
a second tracking loop where said track vectors are analyzed in order to take a proper decision to track said input data stream.

11. The clock and data recovery method of claim 10 wherein said first waiting loop of said second track state comprises:
a fifth verify step wherein a fourth counter of cycles of said oversampling clock is compared with a parameter that defines a waiting time and that is programmable; and
a fourth counting step wherein said fourth counter is incremented.

12. The clock and data recovery method of claim 11 wherein said fifth verify step is substituted by a counting step wherein said transitions are separately counted for each samples of said oversampled stream.

13. The clock and data recovery method of claim 11 wherein it further comprises:
a second reset step wherein said counter is set equal to 0 once it has reached a value equal to said parameter that defines a waiting time;
a sixth verify step wherein said subset of oversampled stream samples corresponding to said search window are checked in order to find out if a transition has occurred; and
in case a transition has occurred in said search window, the method further comprises a third assertion step wherein a second state parameter is asserted and said third output condition corresponding to a second change of state to move the method from said second track state to said first search state is provided,
otherwise, the method changes from said first waiting loop to said second tracking loop.

14. The clock and data recovery method of claim 13 wherein said second tracking loop comprises:
a seventh verify step wherein a fifth counter is compared with said length of said track vectors; and
if the value of said fifth counter is equal to said length, then said fifth counter is set to 1 and the method further comprises:
a fourth assertion step, wherein a third state parameter is asserted; and
a first decision step, wherein first and second driving commands are kept on hold.

15. The clock and data recovery method of claim 14 wherein, if the value of said fifth counter is not equal to said length, the method further comprises:

a fifth assertion step, wherein a fourth state parameter is asserted; and an eighth verify step, wherein it is checked a first condition corresponding to whether the j-th bits of said track vectors are both equal to 1.

16. The clock and data recovery method of claim 15 wherein, if said first condition is verified, then the method further comprises:
a second decision step, wherein said first and second driving commands are kept on hold; otherwise, the method comprises:
a ninth verify step, wherein it is checked a second condition corresponding to whether or not the j-th bit of said first track vector is equal to 1 and the j-th bit of said second track vector is equal to 0 and, is said second condition is verified,
a third decision step, wherein a first decision corresponding to said first driving command is taken corresponding to said oversampled stream being scrolled up.

17. The clock and data recovery method of claim 16 wherein, if said second condition is not verified, the method further comprises:
a tenth verify step, wherein it is checked a third condition corresponding to whether or not the j-th bit of said first track vector is equal to 0 and the j-th bit of said second track vector is equal to 1; and, if said third condition is verified
a fourth decision step, wherein a second decision corresponding to said second driving command is taken corresponding to said oversampled stream being scrolled down.

18. The clock and data recovery method of claim 17 wherein, if said third condition is not verified, the method further comprises:
a fifth counting step, wherein said fifth counter is incremented and after which the method returns to said seventh verify step.

19. The clock and data recovery method of claim 14 wherein, each time a decision step is executed, the method returns to said fifth verify step and said fifth counter is set to 1.

20. A clock and data recovery device comprising:
a first input terminal configured to receive an input data stream at a data rate;
a second input terminal configured to receive a reference clock signal at a clock rate higher that the data rate;
a first output terminal providing a recovered data signal;
a second output terminal providing a recovered clock signal;
a serial-to-parallel converter coupled to said first input terminal and to said second input terminal and having a parallel output, a first input bit of a current word of said input data stream being at an N-th output terminal of serial-to-parallel converter and an N-th input bit of a current word of said input data stream being at a first output terminal of the serial-to-parallel converter, a central output terminal of the serial-to-parallel converter being coupled ti said first output terminal of said clock and data recovery device and providing said recovered data signal (RDATA) at said data rate; and
a divider coupled to a detection and decision block, and second input terminal of said clock and data recovery device and said second output terminal of said clock and data recovery device, the divider configured to provide said recovered clock signal, and detection and decision block having a parallel input connected to the parallel output terminals of said serial-to-parallel converter, wherein said detection and decision block comprises a detection block and a decision block coupled to each other, said detection block having said parallel input coupled to said parallel output of said serial-to-parallel converter and said decision block has a first output terminal and has a second output terminal, wherein the first output terminal of said decision block is coupled to a respective first input terminal of said divider and wherein the second output terminal of said decision block is coupled to a respective second input terminal of said divider and said decision block providing thereto respective first and second driving signals, which change a dividing ratio of said divider of +1 and −1, respectively.

21. The clock and data recovery device of claim 20 wherein said first and second driving signals drive said serial-to-parallel converter in order to move and keep a no-transition area wherein no transitions between adjacent samples are found in a middle of said parallel output.

22. A clock and data recovery device comprising:
a first input terminal configured to receive an input data stream at a data rate;
a second input terminal configured to receive a reference clock signal at a clock rate higher than the data rate;
a first output terminal providing a recovered data signal;
a second output terminal providing a recovered clock signal;
a serial-to-parallel converter coupled to said first input terminal and to said second input terminal and having a parallel output, a first input bit of a current word of said input data stream being at an N-th output terminal of the serial-to-parallel converter and an N-th input bit of a current word of said input data stream being at a first output terminal of the serial-to-parallel converter, a central output terminal of the serial-to-parallel converter being coupler to said first output terminal of said clock and data recovery device and providing said recovered data signal (RDATA) at said data rate; and
a divider coupled to a detection and decision block, said second input terminal of said clock and data recovery device and said second output terminal of said clock and data recovery device, the divider configured to provide said recovered clock signal, said detection and decision block having a parallel input connected to the parallel out terminals of said serial-to-parallel converter, wherein said serial-to-parallel converter of said oversampling portion comprises a hold portion to store a last input bit of a previous input data stream, said hold portion having a further output terminal wherein a last input bit of a previous word of said input data stream is provided at the same time of the N input bits of a current input data stream and which is connected to a further input terminal of said detection and decision block.

23. The clock and data recovery device of claim 22 wherein said second output terminal is coupled to said serial-to-parallel converter.

24. A clock and data recovery device, comprising:
a serial-to-parallel converter configured to oversample an input data stream at a reference clock rate higher than a data rate of the input data stream and having a number of parallel outputs for a current data word; and
a tracking module coupled to the number of parallel outputs of the serial-to-parallel converter and configured to produce a recovered clock signal for the input data stream and to provide the recovered clock signal as a control signal to cause the serial-to-parallel converter to provide a recovered data signal on an output of the number of parallel outputs, and wherein the tracking module comprises:

a detection and decision block having a parallel input connected to parallel output terminals of the parallel outputs of said serial-to-parallel converter, wherein said detection and decision block comprises a detection block and a decision block coupled to each other, said detection block having said parallel input coupled to said parallel output terminals of the parallel outputs of said serial-to-parallel converter and said decision clock has a first output terminal and has a second output terminal, wherein the first output terminal of said decision block is coupled to a respective first input terminal of a divider and wherein the second output terminal of said decision block is coupled to a respective second input terminal of said divider and said decision block providing thereto respective first and second driving signals, which change a dividing ratio of said divider of +1 and −1, respectively.

25. The clock and data recovery device of claim 24, further comprising:

an input to receive a reference clock signal coupled to the serial-to-parallel converter and the tracking module.

26. The clock and data recovery device of claim 25 wherein the divider is configured to receive the reference clock signal and to provide the control signal to the serial-to-parallel converter.

27. The clock and data recovery device of claim 26 wherein, the serial-to-parallel converter has an output for a last input bit of a previous word coupled to the tracking module; and the output providing the recovered data signal is a middle output in the number of parallel outputs.

28. The clock and data recovery device of claim 27 wherein the tracking module is configured to:

detect transitions between adjacent samples provided by the serial-to-parallel converter; and selectively change a dividing ratio of the divider based on the detection of a transition.

29. The clock and data recovery device of claim 27 wherein the control signal causes the serial-to-parallel converter to maintain a no-transition window on outputs in the number of parallel outputs adjacent to the output providing the recovered data signal.

30. A system, comprising:

a reference clock configured to generate a reference clock signal;

a serial-to-parallel converter configured to oversample an input data stream using the reference clock signal and having a number of parallel outputs for a current data word; and a tracking module coupled to the number of parallel outputs of the serial-to-parallel converter and configured to produce a recovered clock signal for the input data stream and to generate a control signal to cause the serial-to-parallel converter to provide a recovered data signal on a middle output of the number of parallel outputs, the reference clock signal having a frequency higher than a data rate of the input data stream, and wherein the tracking module comprises:

a detection and decision block having a parallel input connected to parallel output terminals of the number of parallel outputs of said serial-to-parallel converter, wherein said detection and decision block comprises a detection block and a decision block coupled to each other, said detection block having said parallel input coupled to said parallel output terminals of the number of parallel outputs of said serial-to-parallel converter and said decision block has a first output terminal and has a second output terminal, wherein the first output terminal of said decision block is coupled to a decision block is coupled to a respective second input terminal of said divider and said decision block providing thereto respective first and second driving signals, which change a dividing ratio of said divider of +1 and −1, respectively.

31. The system of claim 30 wherein the divider is configured to receive the reference clock signal and to provide the control signal to the serial-to-parallel converter.

32. The system of claim 30 wherein the serial-to-parallel converter has an output for a last input bit of a previous word coupled to the tracking module.

33. The system of claim 32 wherein the tracking module is configured to:

detect transitions between adjacent samples provided by the serial-to-parallel converter; and selectively change a dividing ratio of the divider based on the detection of a transition.

34. The system of claim 33 wherein the control signal causes the serial-to-parallel converter to maintain a no-transition window on outputs in the number of parallel outputs adjacent to the middle output.

35. The system of claim 30 wherein the reference clock signal frequency is equal to the number of parallel outputs multiplied by the data rate of the input data stream.

* * * * *

UNITED STATES PATENT AND TRADEMARK OFFICE
CERTIFICATE OF CORRECTION

PATENT NO.        : 7,978,801 B2
APPLICATION NO.   : 11/810788
DATED             : July 12, 2011
INVENTOR(S)       : Pierpaolo De Laurentiis et al.

It is certified that error appears in the above-identified patent and that said Letters Patent is hereby corrected as shown below:

Title Page, Item 75
"Pierpaolo De Laurentiis, Milan (IT); Lina Ferrari, Milan (IT); Stefano Manzoni, Cernusco (IT)" should read, --Pierpaolo De Laurentiis, Milano (IT); Lina Ferrari, Milano (IT); Stefano Manzoni, Cernusco S/N (IT)--.

Title Page, Item 56
"6,611,219 B1 8/2003 Chen et al. 341/141" should read, --6,611,219 B1 8/2003 Lee et al. 341/141--.

Column 16
Claim 1, Line 31, "are checked to verify that no-transition occurs" should read as, --are checked to verify that no transition occurs--.

Column 17
Claim 10, Line 53, "stream wherein no transition between adjacent samples" should read, --stream wherein no transitions between adjacent samples--.

Column 18
Claim 10, Line 4, "transition occurs, wherein, in said second track states," should read, --transition occurs, wherein, in said second track state,--.

Column 19
Claim 20, Line 58, "being coupled ti said first output terminal of said clock" should read, --being coupled to said first output terminal of said clock--.

Column 20
Claim 22, Line 37, "being coupler to said first output terminal of said clock" should read, --being coupled to said first output terminal of said clock--.

Signed and Sealed this
Eighth Day of November, 2011

David J. Kappos
*Director of the United States Patent and Trademark Office*

Column 20
Claim 22, Line 46, "out terminals of said serial-to-parallel converter," should read,
--output terminals of said serial-to-parallel converter,--.

Column 21
Claim 24, Line 11, "parallel converter and said decision clock has a first" should read,
--parallel converter and said decision block has a first--.

Column 22
Claim 30, Lines 24-25, "terminal of said decision block is coupled to a decision block is coupled to a respective second input terminal of should read, --terminal of said decision block is coupled to a respective first input terminal of a divider and wherein the second output terminal of said decision block is coupled to a respective second input terminal of--.